United States Patent Office 3,582,499
Patented June 1, 1971

3,582,499
FOAM RUBBER MADE BY REACTING A REACTIVE GROUP POLYMER LATEX WITH POLYISOCYANATES
Thomas H. Rogers, Jr., and Richard E. Fruzzetti, Akron, Ohio, assignors to The Goodyear Tire & Rubber Company, Akron, Ohio
No Drawing. Continuation of application Ser. No. 653,035, July 13, 1967. This application May 20, 1970, Ser. No. 39,170
Int. Cl. C08d *13/08*
U.S. Cl. 260—2.5    8 Claims

ABSTRACT OF THE DISCLOSURE

Organic cellular materials are made from foamed reactive polymeric latices treated with an organic polyisocyanate as a means of converting the latex into a useful cross-linked stable reticular structured foam.

---

This application is a continuation of Ser. No. 653,035, filed on July 13, 1967, now abandoned.

This invention relates to a novel process for making an organic cellular material from a latex of a polymer containing a plurality of active hydrogens wherein the reactive polymeric latex is converted to a foam and cured to a stable reticular structured foam by means of a polyisocyanate by heating the foamed latex in the presence of the polyisocyanate to promote chain extension of the polymer and simultaneously cross-linking the chains through the reactive groups on the chain of the polymer, and thereafter removing water from the cured reticular structured foam.

Polyisocyanates are well known for their reactivity with hydroxyl-containing chemicals and polymers. A polyisocyanate may be used to chain-extend and cross-link a terpolymer made from, for example, butadiene, styrene, and acrylic acid. However, it is well known that polyisocyanates react very readily with water to form a urea and carbon dioxide according to the following equation:

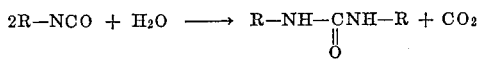

Therefore, the addition of a reactive polyisocyanate to a reactive polymeric latex containing water to bring about chain extension and cross-linking would be considered inoperative by those skilled in this art. Prior to the present invention, it would be reasonable to believe that a polyisocyanate added to the terpolymer latex above would react with the water and not with the polymer. However, it has now been discovered that a reaction does occur with the polymer of the latex when the polymer is an active polymer. The reaction is one of chain-extension and cross-linking as measured by the physical properties of the foam rubber.

The present invention overcomes many difficulties found in the preparation of foamed products when using the well-know sodium silicofluoride gelation technique where the froth-producing soap solution must first be eliminated before the foam is cured in order to permit the polymer particles to knit into a reticulated, gelled structure. The gelled foam is tender and easily damaged, therefore, it must be cured in a conventional manner with, for example, sulfur to form a tough, reticular structured foam.

The present invention not only eliminates the sodium silicofluoride gelation step and its attendant problems including the elimination of the soap destruction step, but also eliminates the necessity for conventional vulcanization which tends to cause discoloration and staining in the foam rubber and further eliminates the use of chemicals which tend to destabilize the polymeric latex, thus providing an improved and simplified process for making a stable reticular structured foam.

The present invention represents an advance over the process shown in U.S. Pat. 3,215,647 where latex foams cured in the presence of certain coreactive materials such as ammoniaformaldehyde condensates, and other formaldehyde condensates, certain amines, liquid epoxides and saturated aliphatic dicarboxylic acids must first be dried to remove water before they can be cured whereas in the present invention, the presence of water does not interfere with the curing of the latex foam rubber. Thus, for the first time, active hydrogen polymeric foam can be made in a closed mold in a single operation, whereas the active hydrogen polymeric foams of the prior art require the drying of the gelled foam before the foam can be cured at temperatures of about 250° F. for periods up to 30 minutes.

The present invention also permits the manufacture of substantially odorless foams compared to a characteristic odor possessed by the active hydrogen polymeric foams of the prior art when cured with a melamine-formaldehyde resin curing agent.

The following examples are illustrative of the concept of the invention and are not to be construed as a limitation of the invention. All parts and percentages are by weight unless otherwise specified.

EXAMPLE I

Preparation of reactive polymeric latex

A rubber diene latex was prepared in accordance with conventional practice using the following formula:

| Materials | A<br>Parts used (dry) | B<br>Range |
|---|---|---|
| Butadiene | 55 | 98-34 |
| Styrene | 40 | 0-64 |
| Hydroxy-ethyl-methacrylate | 5 | 0.5-10 |
| Water | 75 | 60-250 |
| Emulsifier (nonyl phenyl polyethylene glycol ether) | 5 | 1.0-10 |
| Catalyst (potassium persulfate) | 0.06 | 0.05-5.0 |
| Modifier (lauryl mercaptan) | 0.3 | 0.05-5.0 |
| Stabilizer (free acid of organic phosphate ester) | 1.0 | 0.1-5.0 |
| Temperature, ° F | 120 | 100-250 |
| Time, hours | 28 | 10-30 |

The water is added to the reactor, followed by emulsifier, stabilizer, modifier and catalyst and heated to 90° F. after which styrene, hydroxyethyl methacrylate is added. Butadiene is then added and the mixture agitated and heated to 120° F. and the solids followed to the desired solids content.

The resulting latex in Example 1A had a solids content of 60.43%, a pH of 9.12, RVT Brookfield Viscosity of 900 cps. (20 r.p.m. No. 3 spindle), and a surface tension (Cenco-DuNouy) of 29.4 dynes/cm.$^2$.

The following examples are representative of the present invention where the latex in Example 1A above is compounded according to the following formula:

EXAMPLE 2

Preparation of foamable latex using $H_{12}MDI$

|  | A | B |
|---|---|---|
|  | Parts used (dry) | Range |
| 1. Latex of Example 1 | 100 | 100 |
| 2. Antioxidants, dialkylphenylsulfide (40% active in water dispersion) | 1 | .1–5.0 |
| 3. Catalyst, alkanol amine hydrochloride (30% active in water solution) | 2 | .1–10.0 |
| 4. Frothing aid, modified sodium lauryl sulfate, 10% active in water solution | 1.5 | .5–3.0 |
| 5. Surfactant, sodium salt of tridecyl ether sulfate, 33% active in water solution | 1.0 | 0.1–5.0 |
| 6. Surfactant, coconut oil alkanolamide, 90% active in water solution | 0.6 | 0.01–2.0 |
| 7. Cell detackifier, a silicone surfactant, 10% active in water solution | 1.0 | 0.5–5.0 |
| 8. Pigment, TiO$_2$ 60% active in water dispersion | 10.0 | 0–50.0 |
| 9. Filler (a ground marble) 100% active | 100.0 | 0–200.0 |
| 10. Curing agent, hydrogenated diphenyl methane diisocyanate, 100% active | 10.0 | 0.1–40 |

Items 2 through 9 in column A above were added to item 1 in the order listed. The resulting mixture was then foamed to a volume of about five times the original volume and then the polyisocyanate was added and the foaming continued until a volume increase of about eight times was achieved. The resulting foam was then poured into a mold and cured at 300° F. for 20 minutes. The foam rubber produced by this process had a high resilience and was very white in color. Even in the freshly made state, it was free of odor. In addition, as the following table indicates, it has high tensile and elongation, excellent compression, good structure, smooth surface and very good permanent set properties.

For purposes of comparison, a control was made using the formulation used in Example 2A except that 7.5 parts of zinc oxide was used in place of the polyisocyanate; otherwise the same techniques for foaming, curing and drying were used. This sample was tacky and took a permanent deformation upon depression.

EXAMPLE 3

Preparation of foamable latex using 2,4-TDI

|  | Parts (dry) |
|---|---|
| 1. Latex prepared as above (60.4% solids) | 100 |
| 2. Wing-Stay L (hindered polyphenol, 50% active solids in water emulsion) | 1.0 |
| 3. Catalyst (an alkanol amine hydrochloride, 30% active solids in water solution) | 2.0 |
| 4. Emulsifier (modified sodium lauryl sulfate, 10% active solids in water solution) | 1.5 |
| 5. Emulsifier (a sodium salt of tridecyl ether sulfate, 33% active solids in water solution) | 1.0 |
| 6. Emulsifier (a coconut oil alkanolamide, 90% active solids in water solution) | 0.5 |
| 7. Cell wall lubricant (a silicone surfactant 10% active solids in water solution) | 1.5 |
| 8. Pigment, whitener (TiO$_2$ 60% active solids in water dispersion) | 10.0 |
| 9. Pigment, loading (whiting, a ground marble, 100%) | 100.0 |
| 10. Curing agent (a polyisocyanate 100% active solids) (i.e. 2,4-tolylene diisocyanate) | 10.0 |

To the latex (item 1) above, were added items 2 through 9 which are thoroughly mixed into the latex. The resulting physical properties were 66.08% solids, a pH of 8.5, RVT Brookfield viscosity of 1050 cps. (20 r.p.m., No. 3 spindle) and a surface tension (Cenco-DuNouy) of 29.4 dynes/cm.$^2$.

This mix was then frothed by whipping air into the mixture using a planetary mixer and suitable mixing bowl, commonly referred to as a Hobart mixer. The degree of frothing was determined by the desired density of the foam. The curing agent was slowly added and thoroughly mixed into the foamed latex, preferably at ambient room temperature. In the present example, the polyisocyanate used as the curing agent was 2,4-tolylene diisocyanate.

The completed foam was then poured into a mold in the form of a rectangular cavity 0.313 inch thick and placed in an oven for 20 minutes at 300° F. where the foam was cured. The cured foam was removed from the mold and dried.

EXAMPLE 4

Molded foam rubber

The latex of Example 1A above was compounded according to the following formula.

|  | A | B |
|---|---|---|
|  | Parts used (dry) | Range |
| 1. Latex of Example 1A | 100 | 100 |
| 2. Antioxidant dialkylphenylsulfide (40% active in water dispersion) | 2 | .1–5.0 |
| 3. Catalyst alkanolamine hydrochloride (30% active in water solution) | 2 | .1–10.0 |
| 4. Frothing aid sodium lauryl sulfate (30% active water solution) | 2.0 | .5–3.0 |
| 5. Cell detackifier, a silicone surfactant (10% active in water solution) | 1.0 | .5–5.0 |
| 6. Pigment, TiO$_2$ (60% active in water dispersion) | 10 | 0–50 |
| 7. Filler, a ground marble (100% active) | 25 | 0–100 |
| 8. Curing agent: |  |  |
| a. Hydrogenated diphenyl methane diisocyanate | 5 | 0–20 |
| b. 2,4-tolylene diisocyanate | 5 | 2–20 |

Items 2 through 7 in column A above were added to item 1 in the order listed. The resulting mixture was then foamed to a volume of about eight times the original volume and then the blend of polyisocyanates was added and the foaming increased until a volume increase of about 12 was achieved. The resulting liquid foamed mixture was poured into a mold cavity approximately 1½ inches deep which was then closed with a cover containing 1 inch lugs extending into the mold cavity. The mold temperature was 180° F. The mold was then placed in an oven for 25 minutes at 212° F. The resulting foam rubber stripped easily from the mold, was washed, then dried for 24 hours at 158° F. The resulting foam rubber was free from odor and possessed high tensile, high compression, good structure, good color, and good permanent set.

The properties of the finished foam rubber in Examples 2A, 3 and 4A, and the control are reported in the table below.

TABLE

|  | Control | Example 2A | Example 3 | Example 4A |
| --- | --- | --- | --- | --- |
| 1. Tack, minutes to recovery | No recovery | 0.03 | 0.07 | 0.05. |
| 2. Structure | Fair | Good | Fair-good. | Good. |
| 3. Surface | Poor | do | Fair | Fair. |
| 4. Color | Fair | do | Fair-good. | Good |
| 5. Compression (pounds/50″ sq.) | 15.6 | 50.7 | 90.0 | 55.0. |
| 6. Density (pounds/ft.³) | 7.5 | 7.9 | 12.0 | 6.0. |
| 7. Compression/density | 2.1 | 6.42 | 7.5 | 9.1. |
| 8. Tensile, p.s.i. | 4.9 | 12.45 | 19.5 | 18.0. |
| 9. Elongation percent | 310 | 140 | 82 | 100. |
| 10. Permanent set (percent retension) | 61.0 | 90.0 | 89.0 | 94.3. |

NOTE.—Explanation of physical tests used in table
1. Tack is measured by depressing the foam with a blunt object, such as an unsharpened pencil, to the bottom of the foam and holding it in that position for 0.05 minutes, then releasing the pencil and measuring the time in minutes to complete recovery of the foam.
2. Structural appearance is measured by visual judgment. The best structure exhibits round, uniform, small cells.
3. Surface appearance is measured by visual judgment. The best surface is one which is smooth, free of cracks, and which resists abrasion.
4. Color of the sample is measured by visual judgment. The best color is a brilliant white.
5. Load bearing properties are measured in accordance with ASTM D-1055-62.
6. Density is calculated from the weight and volume of a sample.
7. Resistance to compression divided by density is calculated from No. 5 and No. 6, and is for the purpose of comparing different samples on an equal basis.
8-9. Tensile and elongation are measured by stressing a standard foam specimen (0.5 inches wide) and obtaining a stress/strain curve in accordance with ASTM D-1055-62.
10. Permanent set retention is measured in accordance with ASTM D-1055-62.

Any polymer in latex form may be used in the present invention when the polymer is made from at least two polymerizable monomers one of which has at least one active hydrogen as is found in such groups as carboxy, sulfo, primary amino, secondary amino, carboxamido, methyl carboxamide, sulfonamido, primary hydroxy, secondary hydroxy, phenolic hydroxy, aldehidic and epoxy groups. The monomer may have substituent groups which, subsequent to polymerization can be converted to such reactive groups as e.g., ester, nitrile, amide, or salt groups which can be hydrolized to the reactive acid, amine, or hydroxyl groups.

Examples of such ethylenically unsaturated monomers having pendant reactive substituent groups are: acrylic acid, methacrylic acid, itaconic acid, fumaric acid, maleic acid, ethyl acid maleate, 2-sulfo ethyl acrylate, 2-sulfo ethyl methacrylate, 2-aminoethyl methacrylate hydrochloride, 2-aminoethyl acrylate hydrochloride, vinyl benzylamine, alycidyl methacrylate, hydroxystyrene, acrolein, methacrolein, allyl alcohol, vinyl benzyl alcohol, 2-hydroxyethyl acrylate, 2-hydroxyethyl methacrylate, acrylamide, bis-N-methylol acrylamide, N-methylolacrylamide, N-methylolmethacrylamide, bis-N-methylolmethacrylamide, methacrylamide, N-beta-hydroxyethyl acrylamide, N-beta-hydroxyethyl methacrylamide, beta-hydroxypropyl acrylate, gamma-hydroxypropyl methacrylate, 6-hydroxyhexyl acrylate, 6-hydroxyhexyl methacrylate, sodium styrene sulphonate, sodium alphastyrene sulphonate, 2-methylamino acrylate hydrochloride, 2-methylaminoethyl methacrylate hydrochloride, 3-methylaminopropylmethacrylate hydrochloride, 3-methylaminopropylmethacrylate hydrochloride, 3-methylaminobutylacrylate hydrochloride, 3-ethylaminopropyl acrylate hydrochloride and styrene sulfonamide.

In preparing a latex useful in preparation of a foam according to the present invention, at least one of the foregoing monomers having an active hydrogen is polymerized with at least one of the following ethylenically unsaturated compounds including styrene, α-methyl styrene, ar-methylstyrene, ar-ethylstyrene, α-ar-dimethyl styrene, ar,ar-dimethyl styrene, ar-t-butyl styrene, vinylnaphthalene, methoxystyrene, cyanostyrene, acetylstyrene, mono-chlorostyrene, dichlorostyrene, and other halostyrenes, methyl methacrylate, ethylacrylate, butylacrylate, hexylacrylate, 2-ethylhexylacrylate, lauryl methacrylate, phenyl acrylate, acrylonitrile, methacrylonitrile, ethyl α-chloroacrylate, diethyl maleate, polyglycol maleate, vinyl chloride, vinyl bromide, vinylidene chloride, vinylidene bromide, vinyl methyl ketone, methyl isopropenyl ketone, vinyl ethyl ester, 1,3-butadiene, and isoprene.

The monomer with active hydrogen may be used in small amounts, ranging from about 1 part to about 10 parts and preferably from 2 parts to 8 parts. The following well-known reactive polymers may be used in producing the latex useful in making the foam of the present invention:

(1) Butadiene/styrene/hydroxyethylmethacrylate     55/40/5
(2) Butadiene/styrene/methacrylic acid     50/47/3
(3) Butadiene/styrene/acrylic acid     34/64/2
(4) Butadiene/styrene/fumaric acid     45/53/2
(5) Vinyl chloride/vinylidene chloride/2-sulfoethyl acrylate     74.6/24.9/0.5
(6) Butadiene/fumaric acid     98/2
(7) Butadiene/hydroxyethylmethacrylate     95/5

From the foregoing specific examples showing reactive polymers useful in the present invention, it can be observed that from about 95.5 to about 75% by weight of the monomer useful in making the latex of this invention consists of in using ethylenically unsaturated monomers which do not have active pendant or active hydrogen groups. Since the present invention is broadly directed to the discovery that the reactive polymer in a foamed latex can be chain lengthened and crosslinked by adding a polyisocyanate to the foamed latex, a wide range of products as to composition of properties are made possible by this invention, and accordingly, a wide range of end uses. The optimum amount of the monomers having reactive hydrogen which is utilized in the latex will vary according to the use for which it is desired.

Any organic polyisocyanate may be used for curing the foam latices of the present invention. Broadly, any diisocyanate, triisocyanate, or polyisocyanate generally designated polyalkylene polyarylene isocyanates and mixtures thereof may be used. The organic polyisocyanates can be aromatic, aliphatic or cycloaliphatic or combinations of these types. The polyisocyanates generally designated as polyalkylene polyarylene isocyanates are polyisocyanates and mixtures of polyisocyanates corresponding to the general formula $$OCN-R-(CY_2-R'-NCO)_n$$

in which R and R' are arylene radicals, Y is selected from the group consisting of hydrogen, alkyl and aryl radicals, n is a whole number, and the $(CY_2-R'-NCO)$ groups in excess of one are attached to an R' radical, said mixture comprising from 0% to about 70% by weight of the diisocyanate and from 100% to 30% by weight of at least one polyisocyanate containing more than two —NCO equivalents, per mole of polyisocyanate.

Representative polyisocyanates include:

toluene-2,4-diisocyanate
1,6-hexamethylenediisocyanate
1,4-tetramethylene diisocyanate
1,10-decamethylene diisocyanate
1,5-naphthalene diisocyanate
cumene-2,4-diisocyanate
4-methoxy-1,3-phenylene diisocyanate
4-chloro-1,3-phenylene diisocyanate
4-bromo-1,3-phenylene diisocyanate
4-ethoxy-1,3-phenylene diisocyanate
2,4'-diisocyanatodiphenyl ether
5,6-dimethyl-1,3-phenylene diisocyanate
2,4-dimethyl-1,3-phenylene diisocyanate
4,4'-diisocyanatodiphenyl ether
benzidine diisocyanate
4,6-dimethyl-1,3-phenylene diisocyanate
9,10-anthracene diisocyanate
4,4'-diisocyanatodibenzyl
3,3'-dimethyl-4,4'-diisocyantodiphenylmethane
2,6-dimethyl-4,4'-diisocyanatodiphenyl
2,4-diisocyanatostilbene
3,3'-dimethyl-4,4'-diisocyanatodiphenyl
3,3'-dimethoxy-4,4'-diisocyanatodiphenyl
1,4-anthracene diisocyanate
2,5-fluorene diisocyanate
1,8-naphthalene diisocyanate
2,6-diisocyanatobenzfuran, and
2,4,6-toluene triisocyanate.

A polymethylene polyphenylpolyisocyanate 2,4- and 2,6-tolylene diisocyanate
phenolic blocked diphenyl methane diisocyanate
bitolylene diisocyanate
diphenyl methane diisocyanate
hydrogenated diphenyl methane diisocyanate.

The polyisocyanates and the reactive polymeric latex are used in such amounts that the mixtures contain the polyisocyanate in such quantity equal to about 1% to about 40% of the polymeric latex. The polyisocyanate may be mixed with the latex or added as a solution in a solvent.

Thickening agents may be added as desired including such materials as methyl cellulose, hydroxyethyl starch dextrin, hydroethyl cellulose, and sodium carboxyl methyl cellulose.

The pH of the mixture of the latices and the polyisocyanate may be adjusted to any value between a value of about 3 and about 12.

The mixture, including the reactive polymeric latex and the polyisocyanate may be foamed in any well-known manner as, for example, by the use of blowing agents, through the release of a non-coagulating gas such as nitrogen or oxygen. The mixture of latex and polyisocyanates may also be foamed by whipping air into the mixture using well-known apparatus having foamer heads attached as in the Oakes foaming machine. Foaming aids may be added if desired, such as sodium lauryl sulfate as well as foam stabilizers, including potassium oleate. The frothing of the mixture may be adjusted to any desired degree; usually the volume is increased from 5 to 12 times its original volume during the frothing step. The frothed mixture containing the polyisocyanate curing agent may be poured into molds of the closed type as well as open molds since the present invention permits the curing of the latex in the presence of water. Therefore, it is not necessary to remove the water before the latex can be cured in the presence of the polyisocyanate as is necessary in certain prior art processes.

From the foregoing disclosure, it can be seen that a discovery of outstanding merit has been made wherein a polyisocyanate can be used to cross-link a reactive polymeric latex in a foam system without the necessity of removing water from the latex before the curing action takes place. This desirable end result would never be expected by a person skilled in this art dealing with polyisocyanates having a knowledge of its reactivity with water. One would ordinarily never attempt to add a polyisocyanate to a water system with the thought in mind of cross-linking one of the functional groups in the organic material which is desired to be cross-linked in view of the fact that water is present in the system. The results obtained by applicants are indeed unexpected.

While certain representative embodiments and details have been shown for the purpose of illustrating the invention, it will be apparent to those skilled in this art that various changes and modifications may be made therein without departing from the spirit or scope of the invention.

What is claimed is:

1. In the process for preparing a foamed latex from a latex of a copolymer made from at least two polymerizable ethylenically unsaturated monomers from about .5 to 25 percent by weight of the copolymer being made with at least one monomer having active hydrogens present in a radical selected from the group consisting of carboxy, sulfo, primary amino, secondary amino, carboxamido, methyl carboxamide, sulfonamido, primary hydroxy, secondary hydroxy, phenolic hydroxy, aldehidic, and epoxy, and from about 95.5 to 75 percent by weight of the copolymer being made with at least one other monomer being selected from the group consisting of styrene, α methyl styrene, ar-methylstyrene, ar-ethylstyrene, α-ar-dimethylstyrene, ar,ar-dimethylstyrene, ar-t-butylstyrene, vinylnaphthalene, methoxystyrene, cyanostyrene, acetylstyrene, mono-chlorostyrene, dichlorostyrene, methyl methacrylate, ethylacrylate, butylacrylate, hexylacrylate, 2-ethyl hexylacrylate, lauryl methacrylate, phenyl acrylate, acrylonitrile, methacrylonitrile, ethyl α-chloroacrylate, diethyl maleate, polyglycol maleate, vinyl chloride, vinyl bromide, vinylidene chloride, vinylidene bromide, vinyl methyl ketone, methyl isopropenyl ketone, vinyl ethyl ester, 1,3-butadiene, and isoprene by converting the latex to a foam and then curing and drying the foam, the improvement which comprises curing the foam to a stable reticulate structure by reacting the latex with an organic polyisocyanate present in an amount from about .1 percent to about 40 percent based on the weight of the latex as the principal curing agent.

2. In the process of claim 1 wherein the polyisocyanate is a polyarylpolyisocyanate.

3. In the process of claim 1 wherein the polyisocyanate is polymethylene polyphenylisocyanate.

4. In the process of claim 1 wherein the polyisocyanate is hydrogenated diphenyl methane diisocyanate.

5. In the process of claim 1 wherein the polyisocyanate is 2,4-tolylene diisocyanate.

6. The process of claim 1 wherein the polyisocyanate is 2,6-tolylene diisocyanate.

7. The process of claim 1 wherein the polyisocyanate is a phenolic blocked diphenyl methane diisocyanate.

8. The process of claim 1 wherein the latex is a polymer of butadiene, styrene, and methacrylic acid.

(References on following page)

References Cited

UNITED STATES PATENTS

| | | | |
|---|---|---|---|
| 2,993,013 | 7/1961 | Wolfe | 260—2.5 |
| 3,304,273 | 2/1967 | Stamberger | 260—2.5 |
| 3,383,351 | 5/1968 | Stamberger | 260—33.2 |
| 3,410,830 | 11/1968 | Goodman et al. | 260—77.5 |
| 3,419,534 | 12/1968 | Goodman et al. | 260—77.5 |

FOREIGN PATENTS

| | | | |
|---|---|---|---|
| 1,485,153 | 5/1967 | France | 260—2.5 |

DONALD E. CZAJA, Primary Examiner

E. C. RZUCIDLO, Assistant Examiner

U.S. Cl. X.R.

260—2.5AX, 2.5L, 77.5CR